United States Patent

[11] 3,617,369

[72] Inventor Mariano D. Lombardo
    7 Lodge Lane, Parsippany, N.J. 07054
[21] Appl. No. 789,851
[22] Filed Jan. 8, 1969
[45] Patented Nov. 2, 1971

[54] WATER-SOLUBLE POLYVINYL ALCOHOL-COATED WAX SHEET
    1 Claim, 5 Drawing Figs.
[52] U.S. Cl. .................................................. 117/161 UE,
    117/98, 161/109, 249/80, 249/113, 264/221,
    264/316, 264/338
[51] Int. Cl. ....................................................... B28b 7/36,
    B32b 27/06

[50] Field of Search .................................................. 161/109,
    112, 234; 117/92, 161 UE, 98, 4; 18/34.1, 47 C;
    249/112-114; 264/316, 338

[56] References Cited
    UNITED STATES PATENTS
    3,215,763  11/1965  Buerger ......................... 264/338
    3,431,331  3/1969   Pincus et al .................... 249/113

Primary Examiner—Robert F. Burnett
Assistant Examiner—Linda M. Carlin
Attorney—Owen & Owen ABSTRACT: Disclosed is a wax sheet coated with a water-soluble polyvinyl alcohol, said sheet being uniformly perforated. The coated perforated sheet is used to form the integral thermal chamber of a mold or structural part.
A method of making the structural part is also provided.

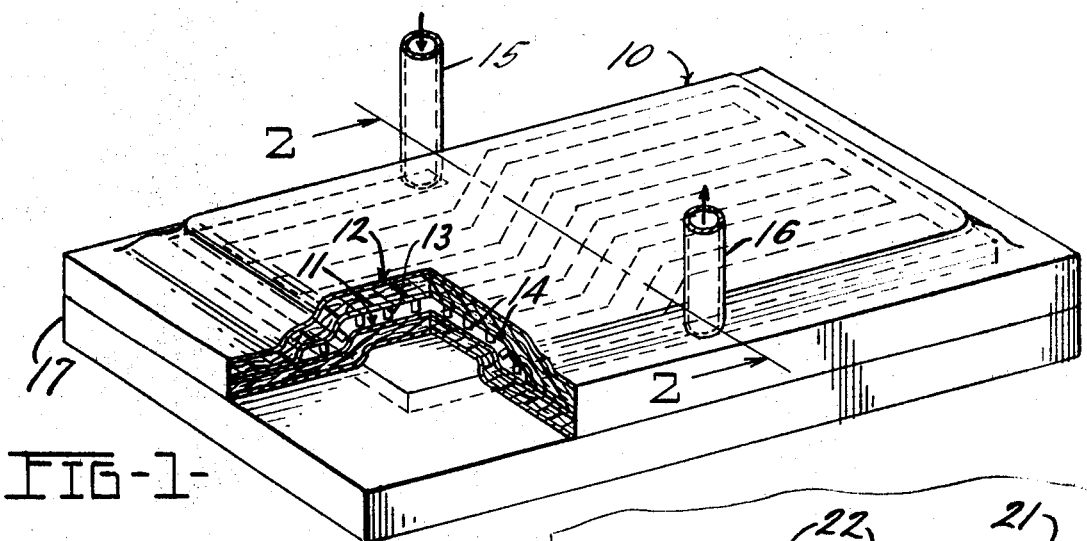
FIG-1-
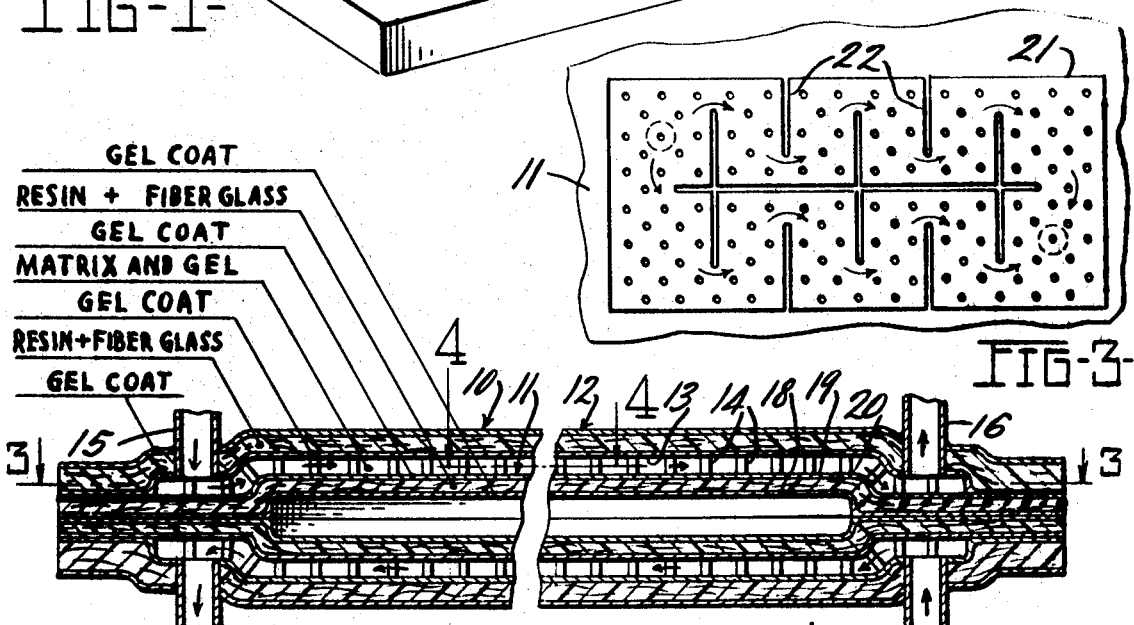
FIG-2-   FIG-3-
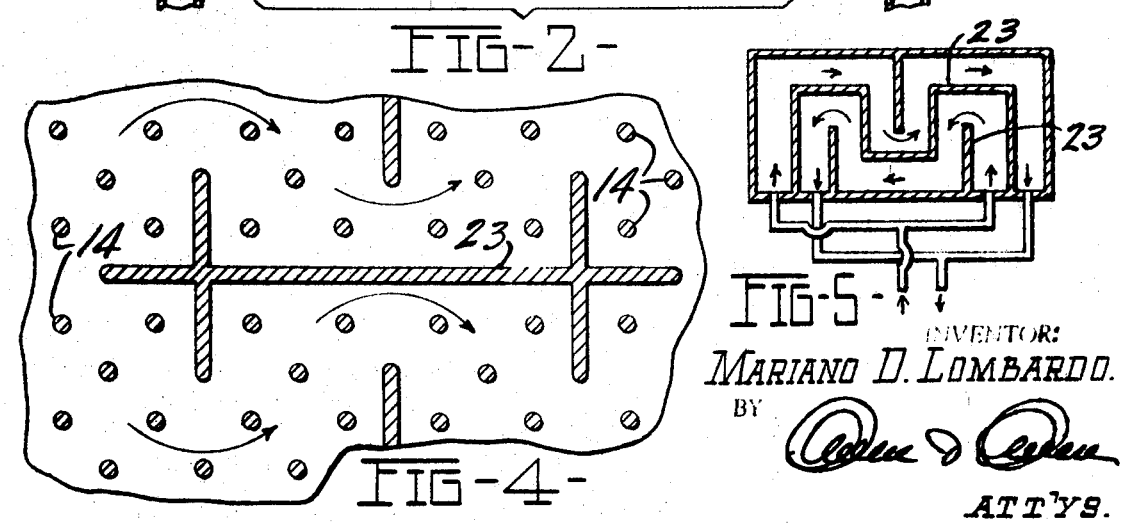
FIG-4-   FIG-5-
INVENTOR:
MARIANO D. LOMBARDO.
BY
ATT'YS.

WATER-SOLUBLE POLYVINYL ALCOHOL-COATED WAX SHEET

BACKGROUND OF THE INVENTION

1. Field of the Invention

This invention relates to structural parts, more particularly plastic molds or dies, and to the method of making them.

In recent years plastic molds or dies have been used in many areas and for many purposes for which metal molds were formerly used. There are several advantages which accrue as a result of using plastic molds. By using plastic molds where suitable instead of machined metal, significant savings are achieved in tooling time and costs. They are easy to repair, and are relatively light in weight and easy to handle.

Heat transfer is a problem with plastic molds and other structural parts because plastics are not good heat transfer materials. Good heat transfer characteristics are required in molds because it is sometimes essential that the object being molded be heated in order to speed up the curing process. This is conventionally done by heating the mold. The heat then transfers from the mold to the object being molded. Sometimes the part also needs to be cooled, or thermocycled, or maintained at constant temperature. This can be accomplished only if the mold has good heat transfer characteristics.

2. The Prior Art

In the prior art plastic molds conventionally have coils molded into the form close to the surface through which heat transfer fluid is circulated. These coils are generally formed from metal or plastic tubing. Fluid pumped through the coils expedites the transfer of heat either to or away from the surface of the mold.

A problem which arises with the use of such coils in plastic molds, however, is that in general the coefficient of expansion of the coils is different from that of the plastic in which they are embedded. When such coils expand as a result of hot heat transfer fluid being circulated therethrough they can conceivably cause cracking of the plastic mold. Conversely, when coolant is circulated through the coils, they can shrink away from the plastic in which they are embedded, diminishing the effectiveness thereof.

In addition, it is difficult to get uniform heat transfer throughout the mold when coils are used.

In many instances of the prior art, electrical heating tapes or blankets are embedded close to the surface of the mold or structural part. This method is expensive and structurally critical, however, in that it promotes stresses and cracks on the surface of the mold or other structural part.

A new method of making thermally controlled plastic molds or other thermally controlled structural parts has now been discovered which eliminates the necessity of embedding heat transfer coils or electrical tapes within the mold, thus allowing less expensive and more efficient molds to be made.

SUMMARY OF THE INVENTION

In its broadest aspect this invention comprises a thermally controllable structural part which has an internal cavity defined by generally parallel walls and perimeter walls connecting the parallel walls; a plurality of support columns extending through the internal cavity, and at least one heat transfer fluid inlet and at least one heat transfer fluid outlet communicating with the cavity, and through which a heat transfer fluid can be introduced into the cavity, circulated and evacuated. Included in the definition of structural parts would be such things as radomes, heated or cooled parts in aircraft, spacecraft and the like having an integrally constructed thermal chamber. Also encompassed within the definition are molds, tools, dies and the like. While not limited thereto, this invention is described in terms of a mold for purposes of illustration.

In one embodiment, the mold of this invention comprises a hollow casing of a reinforced, cured, mold-grade resin composition having one side which has an appropriate configuration relative to the object to be molded, said casing having an internal cavity defined by generally parallel walls and perimeter walls connecting the parallel walls, a plurality of support columns consisting of a cured, mold-grade resin composition extending through said cavity between opposite walls thereof, and at least one heat transfer fluid inlet and at least one heat transfer fluid outlet communicating with said cavity, and through which a heat transfer fluid (liquid or gas) can be introduced into said enclosed cavity, circulated and evacuated.

A preferred mold is one comprising a first layer of a reinforced, cured, mold-grade resin composition having a surface which has an appropriate configuration relative to the object to be molded, a second layer of a reinforced, cured, mold-grade resin composition bonded to said first layer in such a manner as to form a fluid tight enclosed space between the two layers, a plurality of support columns consisting essentially of cured, mold-grade resin composition extending from said first layer to said second layer, and at least one fluid inlet and at least one fluid outlet communicating with said space through which a heat transfer fluid can be circulated.

A method of making the above described mold comprises the steps of:

a. applying a first layer of a reinforced, curable, mold-grade resin composition to a pattern, b. curing the resin composition, c. applying perforated sheet wax coated with water-soluble polyvinyl alcohol to a substantial portion of the back of the first layer, d. introducing a curable mold-grade resin composition into the perforations in the sheet wax, e. positioning at least one fluid inlet and at least one fluid outlet in relation to the coated sheet wax to prevent subsequently applied resin from completely enclosing the sheet wax, f. applying a second layer of a reinforced, curable, mold-grade resin composition to the coated perforated sheet wax and resin composition in the perforations to completely enclose the sheet wax and at least a portion of the inlet and outlet within a casing composed of the first and second layers, g. curing the resin composition within the perforations of the sheet wax, h. curing the resin composition of the second layer, i. heating the coated sheet wax to effect the melting thereof, and j. removing the melted wax and coating from the enclosure within the first and second layers, whereby a fluidtight enclosed space is obtained.

It is an object of the invention to provide a new and useful structural part with an integrally constructed thermal chamber.

It is a further object of the invention to provide a method for producing the structural part.

Other objects and advantages will be apparent from the description to follow, and from the drawings, in which:

FIG. 1 is a perspective view with parts broken away and parts in cross section of the mold of the invention;

FIG. 2 is a cross-sectional view of the mold of the invention taken generally along the line 2—2 of FIG. 1; showing two halves joined together to form a single completed mold;

FIG. 3 is a fragmentary plan view illustrating a part of a mold at one intermediate stage in production and showing a preferred embodiment of perforated sheet wax used in the process of the invention;

FIG. 4 is a horizontal sectional view along the line 4—4 of FIG. 2 showing the interior arrangement of walls and supporting posts in the cavity of the mold of the invention after the perforated sheet wax has been removed; and FIG. 5 is a schematic diagram of a preferred heat transfer fluid flow pattern within the internal cavity.

Referring now in more detail to the drawing, and, in particular to FIG. 1, the mold of the invention comprises a hollow casing 10 formed of a first layer 11 of a reinforced, cured, mold-grade resin composition having an outer surface which has an appropriate configuration relative to the object to be molded, bonded to a second layer 12 of a substantially identical material in such a manner as to form an internal cavity 13. Support columns 14 of cured, mold-grade resin extend from the first layer 11 to the second layer 12, and within the cavity 13. A fluid inlet 15 and a fluid outlet 16 extend through the second layer 12 and open into the cavity 13.

Normally, a supporting structure (not shown) is fastened to the back side of the mold.

In normal operation complementary molds are made to form the desired article. Only one-half of a two-part mold has been described above; however, it will be understood that complementary molds can be made in the same manner. A cross section of two halves is shown in FIG. 2.

To produce a mold according to the method of the invention a pattern 17 of the object to be molded is obtained. Generally the pattern is made of either wood or plastic. The pattern is then suitably prepared. If the pattern is wood, the surface is thoroughly cleaned, and a high-grade wax is applied and rubbed out. Then a parting compound is applied and allowed to dry. Thereafter a paste wax is applied and wiped off without rubbing. All of the above described preparatory steps are conventional to those skilled in the art and do not constitute any part of the invention.

After the pattern is properly prepared, the first step of the method of the invention is to apply the first layer 11 of reinforced, curable, mold-grade resin composition to the pattern 17. This can conveniently be done by first applying a gel coat 18 (a surface coat which is normally applied first on the model to render the subsequent layers obscure) of the desired resin composition to the surface of the pattern 17, followed by alternate layers of glass fiber fabric and resin 19, until the desired thickness is reached. Another gel coat 20 frequently is applied to the back of the last layer of glass fiber fabric. This technique is conventionally known as laminating and is well-known to those skilled in the art.

The first layer 11 of reinforced resin, after being built to the desired thickness, is cured. Depending on the nature of the resin this can be done at room temperature or at an elevated temperature. If done at room temperature curing is accomplished by simply allowing the mold to stand undisturbed.

After the first layer 11 is cured, or at least partially cured and is in a tack-free state, at least one perforated sheet 21 (FIG. 3) of wax of the desired size and thickness is applied to the back side thereof. Preferably, each sheet 21 is uniformly perforated to such an extent that the perforations comprise from about 25 to about 40 percent of the area of the sheet, and most desirably about 30 percent. It has been found that a balance of maximum structural strength and optimum heat transfer efficiency for the finished mold can be achieved when the perforated area is within the above limits. If desired, cutouts 22 can be made in the wax so that walls can be formed therein for directing flow of fluid as will be explained later herein.

The preferred shape or pattern arrangement of the perforations in the sheet wax is ¼-inch round holes on 7/16-inch staggered centers. The shape or pattern arrangement of the perforations may be changed, however, to suit the requirements of the dynamics of the applications.

The sheet of wax is coated with a layer of polyvinyl alcohol, or other resin which is water soluble or melts at the approximate temperature that the wax melts. The resin coating enables the wax to be properly positioned on the first layer, i.e., the wax can be slid around freely without adhering to the resin of the mold, and contaminating the subsurface upon which it is laid. This could not be done without the polyvinyl alcohol or other resinous coating. Wax rub-off would result in the release and subsequent delamination of the reinforced first layer from the cylindrical columns cast in the perforations of the sheet 21, as subsequently described. The sheet 21 conform closely to the surface to which it is applied and can be readily worked into various shapes.

In the preferred embodiment of the invention substantially the entire back of the first layer 11 is covered by as many sheets 21 of coated wax as may be required. The extent of coverage can be varied as desired; however, as a practical matter, the larger the area of the first layer 11 covered, the more efficient heat transfer can be obtained.

After the layer 11 has been covered with the coated perforated sheet or sheets 21, a curable, mold-grade resin composition is introduced into the perforations in the sheet wax 21. Care should be taken to see that the resin fills the perforations entirely and penetrates to the back side of the first layer 11. After the perforations are filled, the resin is cured, forming the columns 14 (FIGS. 1 and 2.)

Next the fluid inlet 15 and the fluid outlet 16 are positioned in relation to the sheet wax 21 to prevent the subsequently applied second layer 12 from completely enclosing the sheet wax. As shown in FIG. 1 the inlet 15 and outlet 16 are tubular; however, the shape is not critical. These are generally filled with wax to prevent subsequently applied resin from blocking the openings.

After the fluid inlet 15 and outlet 16 are positioned, the second layer 12 of reinforced, curable, mold-grade resin composition is applied over the back of the sheet wax 21 and bonded to the aforementioned first layer 11, thus forming the casing 10 around the sheet wax 21. The second layer 12 can be built up in the same manner as the first layer 11 by applying alternate layers of resin and glass fiber fabric. The second layer 12 is also applied in such a manner that it encloses at least a part of the fluid inlet 15 and outlet 16, leaving the orifices thereof open. After the second layer 12 is applied, it is cured.

If desired, the cure of the resin in the perforations can be delayed until after the second layer 12 is applied, then both can be cured together. This results in a strong bond between the columns 14 of resin in the perforations of the sheet wax 21 and the second layer 12.

After all of the resin components are cured, the sheet wax 21 is heated to a temperature sufficient to cause melting of the wax and polyvinyl alcohol or other coating, and the melted wax and coating is then withdrawn through the inlet 15 and/or outlet 16 from the cavity 13 between the first layer 11 and the second layer 12.

The method by which the sheet wax 21 is melted is immaterial. One method is to heat the entire assembly to the necessary temperature. When the wax has reached its liquid state a low-pressure air from a hose connected to inlet 15 or outlet 16 is applied, ejecting the wax from the chamber 13. After most of the wax is ejected in this manner a final purging of the chamber with hot water will completely clean the chamber of any residual polyvinyl alcohol, wax or wax components. Another method is to inject hot liquid into the inlet 15 or outlet 16 and melt the wax in that manner. Either method is suitable.

When the sheet wax 21 is melted and removed from the internal cavity 13, the support columns 14 are left intact and occupy those spaces analogous to the perforations in the sheet wax 21, providing rigid support for the internal cavity of the mold. If the sheet wax 21 originally had cutouts 22 (FIG. 3), then walls 23 (FIG. 4) of cured resin would be formed in those spaces. The walls 23 serve to direct the flow of fluid within the cavity 13.

Some of the aforegoing procedures described encompass conventional shop techniques in casting, laminating, spraying etc. The critical aspect of this invention, however, involves the usage of the special polyvinyl alcohol-coated perforated sheet wax to form the integral thermal chamber in the mold or structural part. The unique and important segment of this specification is directly related to the resultant design of the thermal chamber in the structure described herein and also related to the perforated sheet wax which is coated with polyvinyl alcohol, the utilization of which permits the attainment of the design mentioned because of its easy workability.

After the sheet wax 21 is melted out a heat transfer fluid is circulated through the fluid inlet 15 into the internal cavity 13 and removed through the outlet 16 to add or remove heat from the mold during use.

The support columns 14 also prevent collapse or cracking of the surface of the mold due to normal working pressures.

Almost any resin can be used in the production of the mold of this invention as long as it is of mold-grade and capable of withstanding the temperatures to which it is subjected. Epoxies, polyesters, polyurethanes, phenolics, and silicones have all been sued for tooling purposes. The preferred resins are heat resistant epoxy resins, most preferably those which are cured at room temperature.

There are certain technical considerations which should be observed in the production of a mold according to this invention. For example, the gel coat 18 of the first layer 11 should be applied as thinly as possible in order to reduce surface cracking. This coat preferably is allowed to set to a rubbery but tack-free state and then the alternate layers of glass fiber and resin 19 are applied on top of it. In applications where the surface texture of the glass cloth or other reinforcing agent is tolerable, the laminating resin itself can be used as a surface coat followed immediately with the glass-laminating procedure.

Assuming, however, that the gel coat 18 is applied first, the exposed surface thereof should be sandblasted or manually sanded. Then at least four layers of 6- to 10-ounce glass cloth is applied behind the gel coat with the aforementioned laminating resin. The number of layers is dependent upon the operational pressure of the heating or cooling fluid. For better heat transfer a minimum thickness of reinforcement is used (within safe limitations).

If desired the reinforced layer 19 behind the gel coat 18 can be composed of chopped glass fibers interspersed in a resin. This usually involves the "spray-up" of the glass fiber-resin mix onto the gel coat 18. If the spray-up method is more practical or desirable for the particular application, the thickness of the section 19 should desirably be 1½ times the thickness required for glass cloth-layup systems. Whichever method is used the resin/filler ratio must be practically constant to obtain a uniform coefficient of thermal expansion between the various sections of the mold.

After the first layer 11 is built up, the perforated sheet wax 21 is applied to the exposed surface on the back side thereof and is gently rolled or pressed into place using the fingers. If the mold contours are intricate the sheet wax 21 can be preheated slightly. It will then conform readily to the shape of the mold contour. Caution should be observed, however, in order that the sheet wax 21 is not heated beyond its melting point. The sheet wax 21 should be trimmed to a boundary at least one inch from the periphery of the mold. If zone heating or cooling is required in the design of the mold, two or more sheets 21 can be applied, unjoined, with a ⅛-inch spacing between the edges of the sheets extending from side-to-side of the mold. This will facilitate formation of walls forming two or more separate chambers.

A better alternate in forming the fluid circuit is to cut a ⅛-inch path through the wax 21 where the epoxy or other resin wall is desired. The path will subsequently be filled to provide resin barriers or walls which control the flow of the heat transfer fluid. There is no limit to the possible circuit designs which can be achieved by cutting the walls into the wax.

FIG. 5 illustrates a preferred center flow pattern through the internal cavity.

The sheet wax 21 is similar to that known as pattern-makers wax which is modified to meet the requirements of the method of the invention. Thus it must have the desired melting point and be sufficiently pliable to be able to conform to irregular surfaces without substantial elongation or deformation. A preferred wax for use in the process of the invention is a microcrystalline-modified wax having a melting point of approximately 165° F. Other waxes, such as the thermal-stable waxes which are resin modified, can also be used. These waxes have higher melting temperatures. The particular wax used, relative to melting temperature will vary depending upon the airing temperature of the mold.

After the fluid inlets 15 and outlets 16 are positioned, the voids therearound, if any, can be filled with a resin paste, and the paste allowed to set.

While the process of this invention has been described in terms of the preparation of a glass fiber reinforced plastic mold, it can be appreciated that the process is not limited to the production of such molds. For example, the process can be applied to cast plastic molds wherein a first layer of plastic is cast and cured and the polyvinyl alcohol-coated perforated sheet wax applied to the back of the first layer, then the perforations filled and a cast plastic backup core applied to the back of the polyvinyl sheet wax and bonded to the first layer. In another embodiment a first layer of a reinforced plastic can be built up followed by the application of the polyvinyl alcohol coated sheet wax. Then the perforations can be filled and a cast plastic backup core can be fixed to the back of the sheet wax and bonded to the first layer of reinforced plastic. Conversely the first layer can be a cast plastic layer and the second layer be a glass-fiber-reinforced plastic backup core.

In still another embodiment the first layer can consist of a cast metal, conformally plated metal or sprayed metal surface or possibly a ceramic surface, and the second layer a reinforced plastic backup core.

Regardless of which of the techniques is used, if an epoxy resin is used which can be cured at room temperature, once the mold is completed the entire mold should be allowed to cure at room temperature for 3 days or alternatively allowed to cure 24 hours followed by a heat cure.

After sufficient cure, the mold is exposed to a temperature sufficient to melt the wax core for removal from its cavity. This can be accomplished by exposure of the surface of the mold to steam, hot water, radiant heat or heated air to cause a gradual increase in temperature. Finally the cavity should be cleaned of residual wax and polyvinyl alcohol with a steam or hot water purge.

The process of this invention can be used in the manufacture of all sorts of plastic molds including those to be used in vacuum-forming processes. Vacuum exhaust holes can be drilled through the supporting columns 14 and through the first and second layers 11 and 12, respectively, of the mold, thus avoiding leakage of the heat transfer fluid to the outside or into the vacuum chamber.

It is not essential that the first layer 11 and the second layer 12 have identical construction. That is, the first layer 11 could be sprayed up with a mixture of resin and chopped glass fibers or metal fibers and the second layer 12 or backup section could be built up with glass-reinforced resin. It should be mentioned, however, that it is necessary to substantially match the expansion coefficient of the first layer 11 and the second layer 12 regardless of which combination is used. Any significant difference in the coefficient of expansion between the first layer 11 and second layer 12 or backup layer will promote distortion of the layer or cracking of the supporting posts 14 during thermal cycling of the mold. The final backup structure is built according to the requirements of the application.

In still another embodiment any one of the above constructions can be prepared with two chambers, one behind the other where the one nearest the surface of the mold is used for heat transfer and the one furthest from the surface is used for a vacuum or heat transfer chamber. Vacuum exhaust holes can then be drilled through the supporting columns 14 and through the first and second layers 11 and 12, respectively to the second cavity which would in turn be connected to a single vacuum exhaust outlet.

The method of this invention can be applied to the production of a number of different types of structural parts, and is not limited to the production of molds or dies but only to the production of structural parts which contain an integral heat transfer cavity.

It will be appreciated that variations can be made in the structure and the method of the invention without departing from the spirit and scope of the appended claims.

What I claim is:

1. A sheet of wax coated with water-soluble polyvinyl alcohol and sufficiently pliable to conform to irregular surfaces and uniformly perforated to such an extent that the perforations comprise from about 25 to about 40 percent of the area of the sheet.